3,464,524
DRUM BRAKES FOR VEHICLES
Charles Newstead, Walsall, England, assignor to Girling Limited, Birmingham, Warwickshire, England, a British company
Filed July 7, 1967, Ser. No. 651,717
Claims priority, application Great Britain, July 9, 1966, 30,936/66
Int. Cl. F16d 51/00, 65/14
U.S. Cl. 188—78                  11 Claims

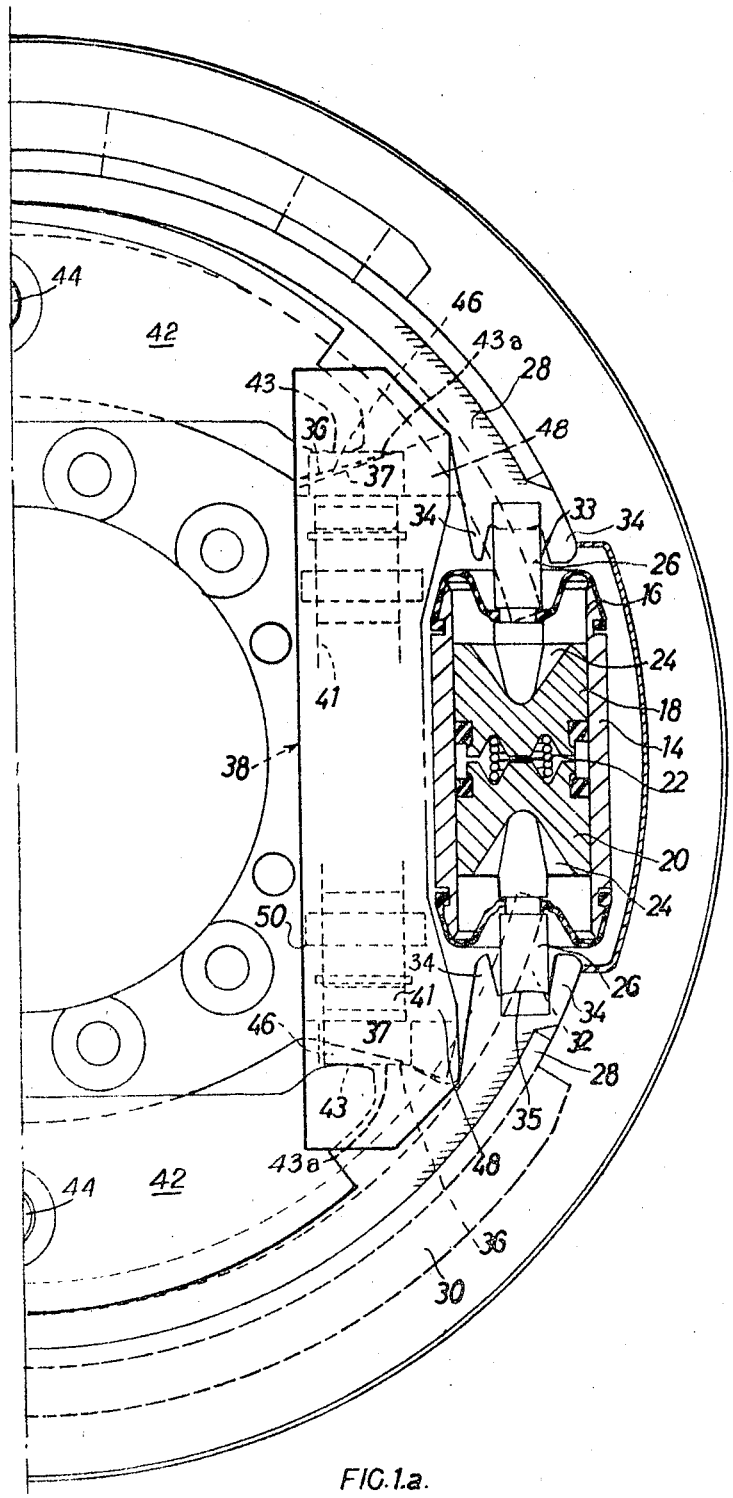
FIG.1.a.

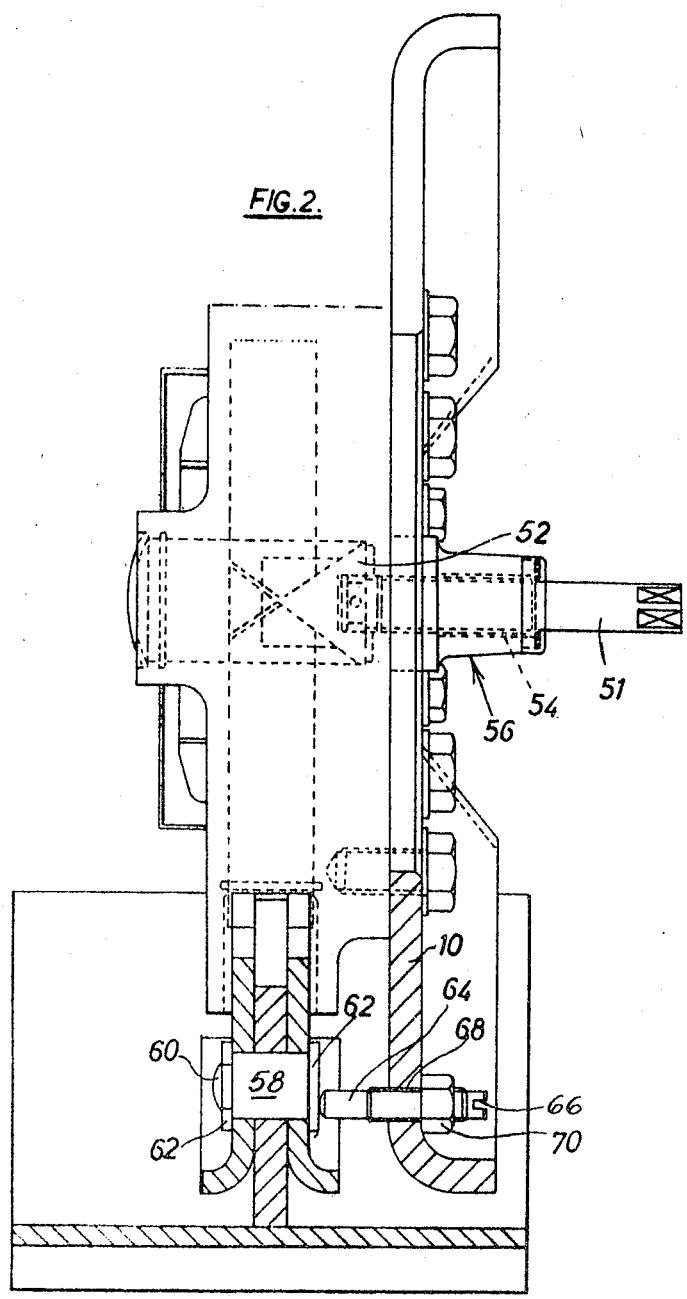

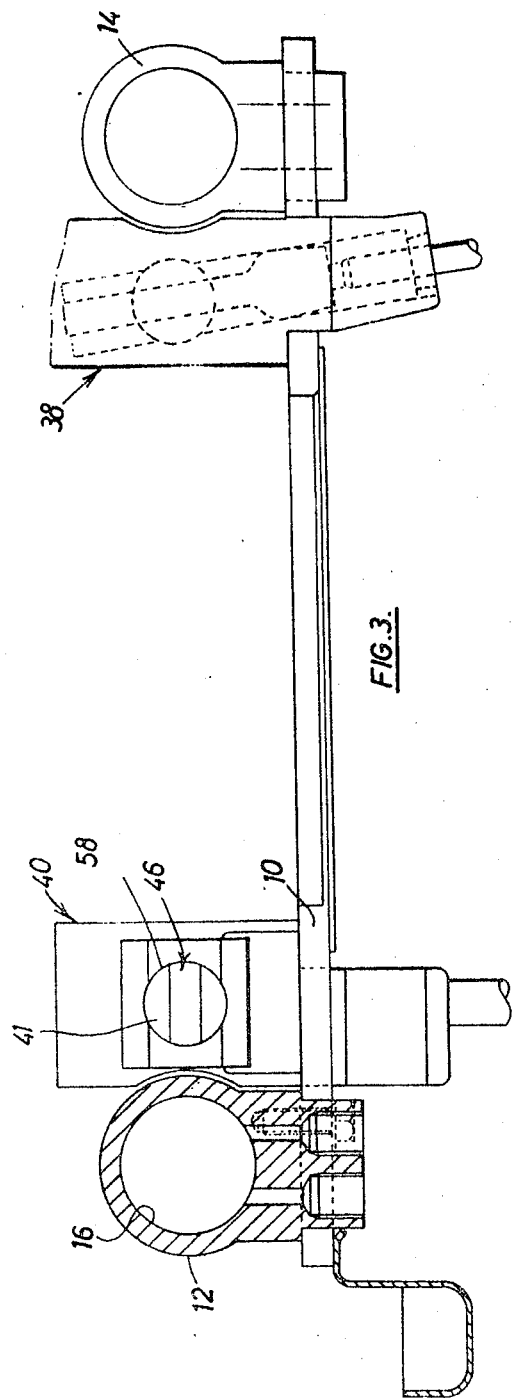

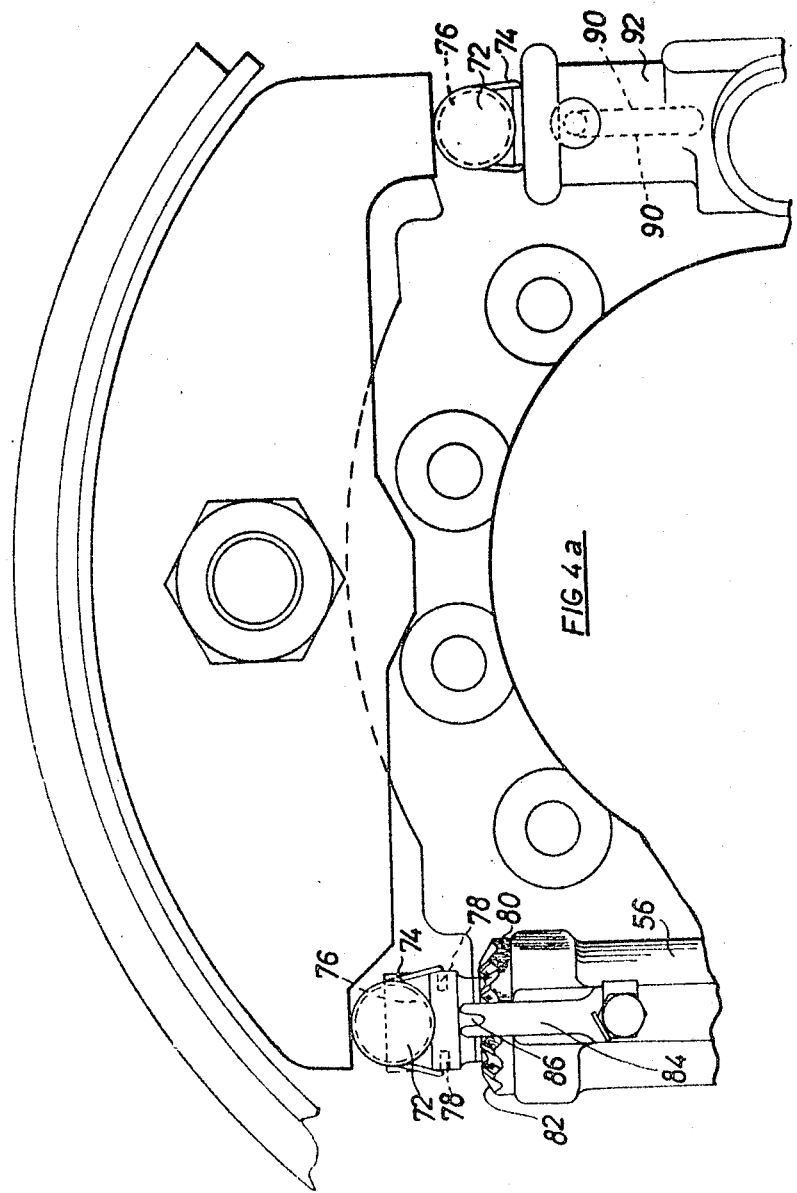

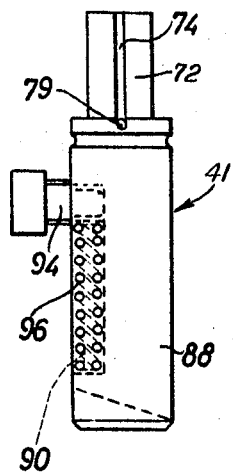
FIG.4.b.
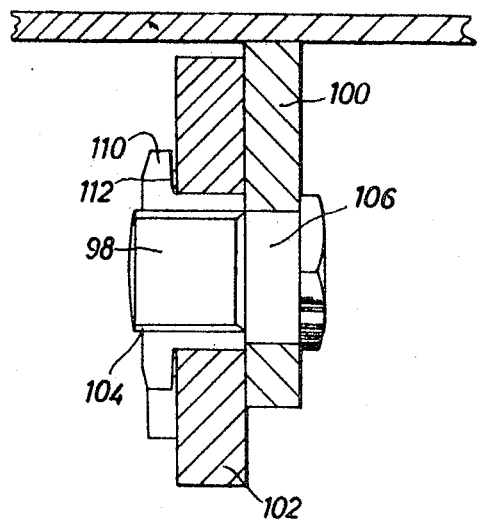
FIG.5.

ABSTRACT OF THE DISCLOSURE

The invention concerns carrier-actuated drum brakes for vehicles, wherein the brake shoes carrying the brake linings of friction material are themselves mounted on carriers and the shoes are operable into a braking position by first actuator means and the carriers are acted on by second actuator means independent from the first actuator means, a force transmitting coupling being provided between each carrier and the brake shoe mounted thereon to transmit force to the shoe and move the latter into its braking position in response to appropriate movement of the carrier. The brake includes a fixed abutment for each brake shoe to take drag force therefrom during braking and adjustable abutment means for the carriers to adjust the rest position thereof to compensate for wear of the frictional material. Each brake shoe is mounted on its carrier by means of a pin coupling located substantially midway between the two ends of the shoe. This coupling permits relative angular displacement of each shoe and carrier about the coupling but when the second actuator means is operated, the coupling constrains the carriers to move in a translatory sense relative to said adjustable abutment means as each brake shoe is moved towards its fixed abutment. The invention is particularly applicable to drum brakes for the rear wheels of motor vehicles where it is desired to provide braking by means of two independent systems. In this case the first actuator means conveniently comprises a double acting hydraulic actuator and the second actuator means comprises a double acting mechanically operable actuator.

---

Figure 1:
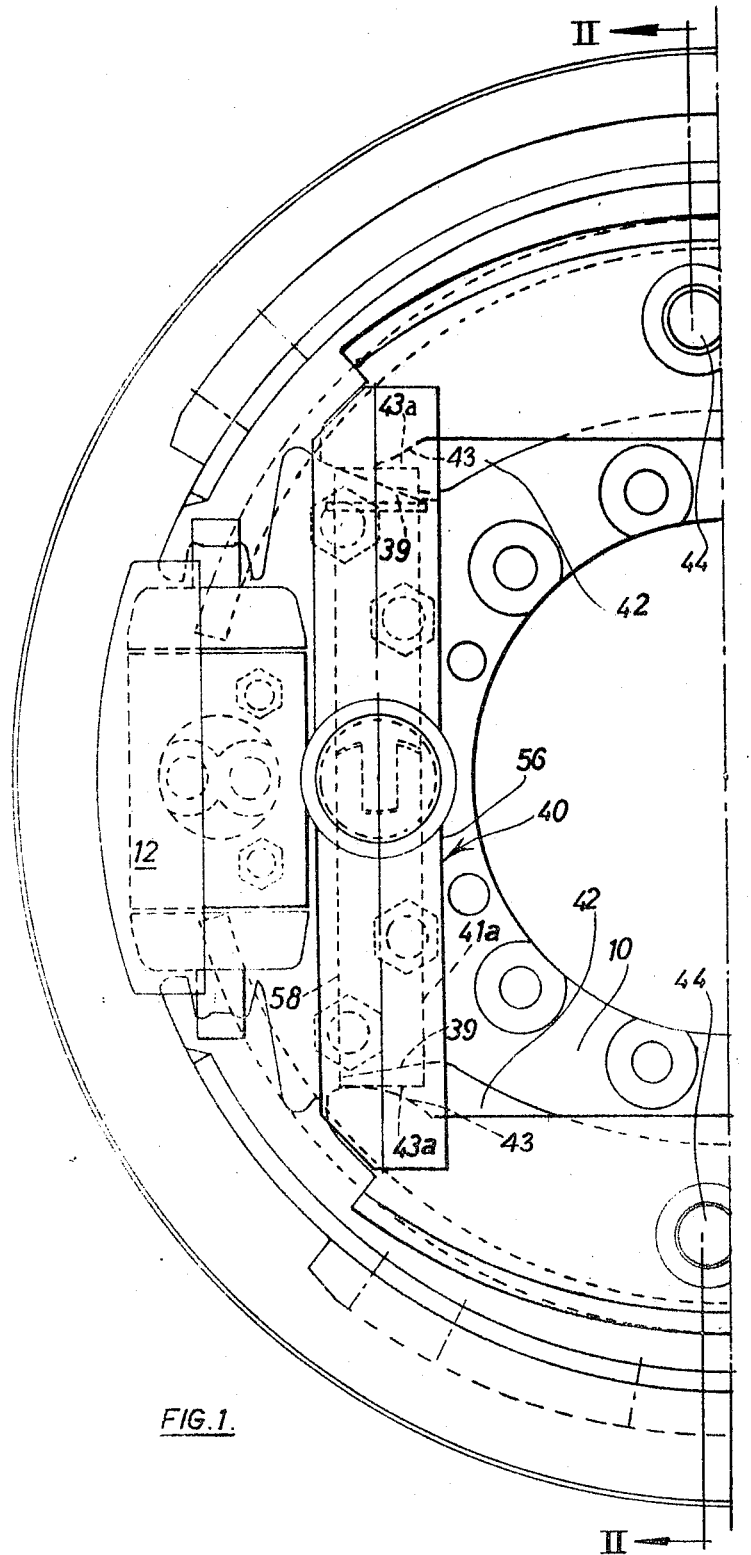

This invention relates to drum brakes for vehicles and in particular to carrier-actuated drum brakes.

In a carrier actuated brake the mechanical linkage normally associated with the hand brake is arranged to act on at least one of the brake shoes through a lever, usually termed a carrier, and also through an articulating strut arranged between the shoe and the carrier, and the shoe is mounted in such a way that it acts as a leading shoe during braking in both forward and reverse directions of rotation of the brake drum. This arrangement is commonly used where the service braking facilities comprise a pair of shoes which are hydraulically operated and are arranged to act as leading shoes during braking in both directions of rotation of the brake drum and it is usual to arrange for both the shoes to be carrier actuated by the hand brake.

The term leading shoe is taken to mean a brake shoe which is actuated at or towards, the end thereof which is first swept by a point on the drum commonly referred to as the leading end and is anchored (or more usually engages a stationary abutment) at its other end, commonly referred to as the trailing end.

According to the present invention, a drum brake comprises a shoe, a carrier, an actuator operable in use to exert force on the carrier, force transmitting means to transmit force from the carrier to the shoe, a fixed abutment engageable by the shoe to take drag force from the shoe and a fixed support surface engageable by the carrier, said force transmitting means permitting relative angular movement between the shoe and the carrier, but, when the actuator is operated, constraining the carrier to move in a translatory sense relative to the support surface as the shoe moves towards the fixed abutment.

Preferably the carrier slides on the support surface.

According to a further modification, a roller is provided between the carrier and the support surface.

Preferably, each roller is retained by a strip of springy material which passes around the roller and lies in a shallow groove formed in the periphery of the roller.

The invention will now be described by way of example with reference to the drawings in which:

FIG. 1 is a part of a front view of a drum brake assembly constructed as one embodiment of the invention, FIG. 1a is the remaining part of the front view of FIG. 1, FIG. 2 is a side view of part of the brake illustrated in FIG. 1 sectioned along the line II—II in FIG. 1, FIG. 3 is another side view of the brake illustrated in FIG. 1 partly in section, to indicate the free end of an adjuster tappet, FIG. 4a is a front view of a portion of a modified brake embodying rollers between the end faces of the tappets and the carriers, FIG. 4b is a side view of an actuator tappet having a roller fitted to its end face, and FIG. 5 is a cross-sectioned detail illustrating an alternative form of pin for joining the carriers and the brake shoes.

FIGS. 1 and 1a correspond to FIG. 1 of the drawings and since they should be read in conjunction with one another, they will hereinafter be referred to simply as FIG. 1.

FIG. 1 shows a carrier-actuated drum brake which comprises a generally circular backplate 10 having a pair of hydraulic actuators 12, 14. Each hydraulic actuator comprises a hydraulic cylinder 16 having two oppositely displaceable pistons 18, 20. A spring 22 is fitted between the two inner end faces of the two pistons, and is retained in an annular recess formed in each end face. The outer end face of each piston is formed with a central recess 24 into which is fitted one end of a strut 26. Two brake shoes 28 having friction elements 30 are carried by the backplate 10. The ends of the brake shoes 28 engage the struts 26 and to this end the latter are slotted at 32 and the ends of the shoes 28 cut away at 33 to form a mouth having jaws 34 and an inner abutment surface 35.

A shoe-return tension spring (not shown) is provided extending between the shoe 28 and is arranged on one side of the shoe webs so as to also provide a bias urging the webs towards the backplate 10 as described below.

A mechanically operable brake actuator 38 and a mechanically operable brake adjuster 40 are arranged between, and parallel to, the two hydraulic actuators and fixed inclined abutment faces 37, 39 are provided at the ends of the mechanical actuator 38 and adjuster 40, respectively.

The web of each brake shoe 28 is sandwiched between two plates 42 forming a carrier. Each shoe 28 is connected to its carrier by a pin 44. Each plate 42 has end abutment surfaces 43. The mechanically operable actuator 38 has two oppositely displaceable tappets 41 having square outer end support faces 43a each of which is slotted at 46. The brake shoe ends 36 are received in the slots 46 while the ends 43 of the carrier plates 42 abut the support faces 43a on either side of the slots 46. Wedge-shaped abutment members 48 are disposed between the jaws of the slots 46 in the actuator tappets 41, and are arranged to abut the actuator housing to prevent the members 48 from moving.

The operating face 37 of the wedge members 48 which is engaged by the end 36 of the shoe is inclined to the end face 43a of the tappet 41. The tappets 41 in the actuator 38 are outwardly displaceable by mechanically operable means such as a wedge, which is operable by a mechanical linkage from a handbrake lever.

When the lining of friction material is substantially unworn the pin coupling 44 between each brake shoe and its carrier, is offset towards the wedge type adjuster 40 relative to a diametral line parallel to the axis of the adjuster 40. As the friction material wears down, the pin coupling moves progressively to the right (in the drawings) until, when the friction material is ready for replacement, it is offset by a commensurate distance on the opposite side of the diametral line referred to above.

The adjuster 40 comprises a housing having two oppositely displaceable tappets 41a having outer square end support faces 43a engaged by the carrier ends 43 and having oppositely inclined inner end faces abutting a wedge 52. The wedge is arranged at the end of an adjuster spindle 51 which is threaded over at least a portion of its length and is threadedly engaged in a correspondingly threaded bore 54 in the actuator housing 56. The free end of the adjuster spindle 51 is of square cross-section so that it can be turned by a spanner in one direction to urge the wedge 52 between the inclined inner end surfaces of the two tappets 41a, thereby separating the tappets. This causes outward movement of the ends of the carriers and brake shoes to compensate for wear of the frition linings 30.

The wedge 52 is located within a cylindrical bore transverse to the tappets and engages the wall of the bore to transmit drag force to the adjuster housing when the brake is applied and thrust is exerted by one or the other shoe on its tappet.

As is shown in FIG. 2, the pin 44 which connects each brake shoe to its carrier plates 42 comprises a shank 58 with a head 62 at each end. One head 62 engages a steady post 64, having a screwdriver slot 66, mounted in the back plate 10 and locked in position by a locknut 70. The shoe-return spring mentioned above biases the shoes towards the posts 64 and thus the steady post enables the shoe and the carriers to be set up and maintained parallel to the backplate.

The brake described above operates as follows: on hydraulic pressurisation of the hydraulic actuators the shoes move outwardly until they engage the drum. They then move with the drum until one or the other of their ends 36 meets the corresponding abutment 37 or 39. Drag from the shoe in each case is transmitted in the case of abutment 37 direct to the housing of the mechanical actuator, while in the case of abutment 39 the drag causes a thrust to be exerted on the adjuster tappet 41a which is transmitted to the wedge 52 and thence to the adjuster housing as explained above. This represents service braking. Clearly, each shoe functions as a leading shoe, being actuated at one end and engaging an abutment at the other end.

If the vehicle should roll back after coming to rest, the shoes move round with the drum during the reverse motion and then engage the abutments at their opposite ends when the drag transfer will be again exactly as described above, although the shoes are now actuated at their other ends.

Actuation of the handbrake causes the wedge of the mechanical actuator 38 to force the actuator tappets 41 outwardly. This moves the corresponding ends of the carriers 42 outwardly which, through the pins 44, moves the shoes outwardly too (or exerts force on the shoes if they are already engaging the drum under hydraulic service application).

The force exerted on the shoes is about twice that exerted on the carrier ends by the mechanical actuator owing to the lever ratio. The shoes are thus actuated at about midway between their ends but engage at one or other of their ends, according to drum rotation, with a fixed abutment. The shoes are thus still "leading" shoes.

If the drum is rotating when the handbrake is applied, and if the service brake is not already causing the shoes to engage their respective fixed abutments, the shoes move with the drum until they engage their abutments. The carriers move with the shoes, sliding on their support surfaces 43a.

Due to friction between the carriers and their support surfaces 43a, some drag force experienced by the carriers is transmitted to the support surfaces and therefore to the mechanical actuator and adjuster housings.

If the vehicle rolls back after the handbrake is applied, the service brake having been released, as might occur on an incline the shoes leave the abutments at their former "trailing" ends and move round with the reverse turning drum. The carriers also slide on their support surfaces. It is arranged that the discrepancy between the effectively arcuate shoe movement and the effectively chordal movement of the carriers arising at the pins 44 does not give rise to loss of effective application of the shoes to the drum. This is achieved because the elastic deformation of the shoe, carrier and drum together with the mechanical actuation linkage is sufficient to maintain the mechanical actuator tappets forced outwardly and thus ensure application of the shoes when they engage the opposite abutments as the drum turns in reverse.

During mechanical brake application, the pins 44 under load do not allow any relative translator movement between the shoes and carriers. Translatory movement of the carriers with the shoes is accommodated by the support surfaces 43a.

In an alternative embodiment, part of which is illustrated in FIG. 4a, a roller 72 is disposed between each carrier plate abutment surface 43 and a tappet end, and, as shown in FIG. 4b, each roller is retained in position by a narrow strip of springy material 74 which passes round the roller 72 and lies in a shallow groove 76 formed in the peripheral surface of the roller, the ends of the strip 74 being bent to form lugs 78 which engage recesses 79 formed in the end region of the tappet.

In addition, although the adjuster conveniently comprises wedge mechanism, alternative mechanically operable means may be used and as illustrated in FIG. 4a the adjuster tappets may be threaded over a portion of their length and threadedly engage in nuts 80 which are rotatably mounted at opposite ends of the actuator housing 56 but are prevented from moving with the tappets. Each nut 80 is formed with a serrated edge 82 and a strip of springy material 84 which is secured at one end to the housing 56 and is formed with a tongue at the other end 86, is bent so that the tongue 86 resiliently engages the grooves in the serrated edge 82. The strip of springy material 84 thereby constitutes a click spring pawl which retains the nut 80 in any selected position. It will be evident that rotation of a nut 80 in one direction will cause the tappet 41 to move axially outwardly from the housing 56 whilst rotation in the opposite direction will cause the tappet to be retracted into the housing. This axial displacement of the tappets enables compensation for wear of the brake shoe linings to be effected.

As is shown in FIG. 4b each tappet 41 in the actuator 38 comprises a cylindrical member 88 which may additionally have a recess 90 formed in its outer peripheral surface along a portion of its length. The tappets are arranged in a cylindrical bore in a housing 92 with a radially directed stop member 94 projecting partway into the recess 90. A helical spring 96 is arranged in the recess 90 between one end thereof and the inwardly projecting abutment 94, whereby displacement of the tappet 88 out of the housing 92 causes compression of the spring 96 so that on removal of the displacing force the tappet 88 is returned to its nonactuated position within the housing, under the restoring force of the spring 96.

A still further modification of the brake illustrated in FIG. 1 is shown in FIG. 5 in which an alternative form of pin construction is shown. In FIG. 5 the pin 98 joining the brake shoe 100 to a single carrier plate 102 comprises a central cylindrical shank portion 106 which is formed at one end with a threaded shank portion 104 which extends axially but eccentrically from said one end and which is formed at its other end with a hexagonal bolt head. The central cylindrical shank portion 106 has an axial length substantially commensurate with the thickness of the brake shoe 100 and is rotatably fitted in a circular aperture formed in the brake shoe. The threaded shank portion 104 is threadedly engaged in a cylindrical boss 108 having an internally threaded cylindrical bore and which is formed at one end with a portion of increased diameter to form a radial flange 110. The boss 108 is fitted in a circular aperture in the carrier plate 102 and a wave washer 112 is fitted between the flange 110 and the face of the carrier plate 102. The wave washer serves as a spring damper. For taking up manufacturing tolerances during initial assembly the pin 98 causes the eccentric shank portion 104 to rotate about the axis of the central shank portion 106 thereby altering the relative positions of the carrier plate 102 and the brake shoe 100. Although a hexagonal bolt head is shown in FIG. 5 it will be evident that any suitably shaped head portion may be used such as a square or triangular cross-section head portion or a screwdriver slot may be formed in its end face.

Although the surfaces 36 of the brake shoes have been described as engaging fixed abutments it will be realised that these abutments need not be fixed permanently but may be adjustable relative to the back plate 10 or the respective actuator or adjuster housing in order to compensate for wear of the brake shoe linings.

With the embodiments described above, a very simple connection between the carrier and shoe achieves very satisfactory force transmission on actuation and the need for an expensive and more complicated articulating strut construction is avoided.

I claim:
1. A drum brake comprising in combination a brake plate, a brake shoe, a shoe abutment engageable by the shoe to take drag force from the shoe, a carrier, a pin coupling between the shoe and carrier substantially midway between opposite ends of the shoe which permits relative angular displacement of the shoe and carrier about the coupling, an actuator on the brake plate, an abutment on the actuator engagement by one end of the carrier by which force is transmitted from the actuator to the carrier, and a normally fixed second abutment carried by the brake plate and engageable by the other end of the carrier, the last two abutments presenting substantially parallel surfaces on which the carrier ends are slidably supported for movement relative to the abutments in a direction substantially perpendicular to the direction in which force is applied to the carrier from the actuator.

2. A drum brake as set forth in claim 1 wherein the pin coupling between a brake shoe and its carrier, when the lining of friction material is in its substantially unworn condition, is offset twoards the wedge type adjuster relative to a diametral line parallel to the axis of said adjuster.

3. A drum brake as set forth in claim 1 wherein the brake shoe and carrier are formed with axially aligned holes and the pin coupling between the shoe and carrier includes a pin of circular cross section which is a tight rotatable fit in the two axially aligned holes formed in the shoe and carrier.

4. A drum brake as set forth in claim 1 wherein the brake shoe and carrier are formed with aligned holes and wherein the pin coupling between the shoe and carrier comprises a pin of circular cross-section having an eccentric end region which is arranged as a tight rotatable fit in the holes formed in the shoe and carried with the eccentric end region wholly contained within the brake shoe so that rotation of the pin relative to the carrier results in adjustment of the relative position of the carrier and brake shoe.

5. A drum brake as set forth in claim 1 in which the carrier comprises two plates which are located one on either side of the brake shoe.

6. A drum brake as set forth in claim 1 in which the ends of the carrier present two parallel plane sliding surfaces for engagement by the two abutments and in which the two abutments are curved to facilitate sliding on said surfaces.

7. A drum brake as set forth in claim 1 comprising two actuators arranged at opposite ends of the brake shoe to effect braking movement of the shoe independently of actuation of the actuator for the carrier whereby braking may be achieved by direct actuation of the brake shoe by the said two actuators or indirectly by movement of the carrier in response to operation of the carrier actuator.

8. A drum brake as set forth in claim 1 wherein the ends of the carrier present two parallel plane sliding surfaces and the abutment on the actuator and the second abutment include rollers movably engaged by the plane sliding surfaces of the carrier.

9. A drum brake as set forth in claim 8 further comprising a pair of U-shaped strips of springy material, each roller having a shallow groove in its peripheral surface to accommodate one of said U-shaped strips, the ends of said U-shaped strips being attached to said actuator and to said second abutment, respectively, to retain the rollers thereon.

10. A drum brake as set forth in claim 1 comprising a second shoe and carrier arranged in a diametrically opposite region of the brake drum from said first shoe and carrier, a pair of double acting hydraulic actuators separate from the first stated actuator and disposed between adjacent ends of the two brake shoes, a mechanically operable expander located between two adjacent ends of the two carriers and comprising the first stated actuator, said normally fixed abutment comprising a wedge type adjuster positioned between the other two adjacent ends of the carriers to provide an abutment surface for each carrier while permitting adjustment of the rest position thereof to compensate for wear of the friction material.

11. A drum brake as set forth in claim 1 in which the carrier ends are curved to facilitate sliding on said surfaces.

References Cited

UNITED STATES PATENTS

| 2,453,866 | 11/1948 | Schnell. | |
| 2,046,806 | 7/1936 | Baum | 188—78 |
| 2,087,371 | 7/1937 | Chambers. | |
| 2,294,293 | 8/1942 | Goepfrich. | |
| 2,822,065 | 2/1958 | Goepfrich. | |
| 3,047,099 | 7/1962 | Dahle | 188—105 |

MILTON BUCHLER, Primary Examiner

T. W. BUCKMAN, Assistant Examiner

U.S. Cl. X.R.

188—105, 79.5